(12) United States Patent
Santana Ramirez (10) Patent No.: US 11,018,350 B2
(45) Date of Patent: May 25, 2021

(54) IONIC ELECTRIC POWER STATION

(71) Applicant: Alberto Andres Santana Ramirez, Las Palmas (ES)

(72) Inventor: Alberto Andres Santana Ramirez, Las Palmas (ES)

( * ) Notice: Subject to any disclaimer, the term of this patent is extended or adjusted under 35 U.S.C. 154(b) by 106 days.

(21) Appl. No.: 16/091,684

(22) PCT Filed: Mar. 27, 2017

(86) PCT No.: PCT/ES2017/000038
§ 371 (c)(1),
(2) Date: Oct. 5, 2018

(87) PCT Pub. No.: WO2017/174836
PCT Pub. Date: Oct. 12, 2017

(65) Prior Publication Data
US 2019/0131631 A1 May 2, 2019

(30) Foreign Application Priority Data
Apr. 5, 2016 (ES) .............................. ES201600237U (51) Int. Cl.
| | | |
|---|---|---|
| *H02J 1/10* | (2006.01) | |
| *H01M 6/34* | (2006.01) | |
| *H02J 7/00* | (2006.01) | |
| *H01M 50/20* | (2021.01) | |
| *H01M 6/50* | (2006.01) | |
| *H01M 16/00* | (2006.01) | |

(52) U.S. Cl.
CPC ........... *H01M 6/34* (2013.01); *H01M 6/5011* (2013.01); *H01M 6/5038* (2013.01); *H01M 16/00* (2013.01); *H01M 50/20* (2021.01); *H02J 7/00* (2013.01); *H01M 2220/10* (2013.01); *H02J 7/0068* (2013.01); *Y02P 20/133* (2015.11)

(58) Field of Classification Search
CPC ...... H01M 6/34; H01M 2/1077; H01M 16/00; H01M 2220/10; H01M 50/20; H01M 6/5011; H01M 6/5038; H02J 7/00; H02J 7/0068; Y02P 20/133
See application file for complete search history.

(56) References Cited

U.S. PATENT DOCUMENTS

| | | |
|---|---|---|
| 3,470,032 A | 9/1969 | Egan |
| 3,542,598 A | 11/1970 | White et al. |
| 3,907,596 A | 9/1975 | Ketler, Jr. |
| 3,941,616 A * | 3/1976 | Huhta-Kowisto ...... H01M 6/34 429/119 |
| 3,959,023 A | 5/1976 | Le Garde |

(Continued)

FOREIGN PATENT DOCUMENTS

| | | |
|---|---|---|
| GB | 2177556 A | 1/1987 |
| WO | 2009143670 A1 | 12/2009 |
| WO | 2015098011 A1 | 7/2015 |

*Primary Examiner* — Rexford N Barnie
*Assistant Examiner* — Rasem Mourad
(74) *Attorney, Agent, or Firm* — Hayes Soloway PC (57) ABSTRACT

The operation of the ionic electric power station is based on the stable corrosion of a plurality of sacrificial anodes immersed in sea water or water with common salt inside a cell, without membranes to separate the cathodic zone from the anodic zone, kinetic conditions being generated inside the cell by the circulation of water moved by a pump in a closed circuit between the cells and a reservoir.

12 Claims, 6 Drawing Sheets

(56) References Cited

U.S. PATENT DOCUMENTS

| | | | | |
|---|---|---|---|---|
| 4,338,384 A | * | 7/1982 | Rouge | H01M 6/34 |
| | | | | 429/119 |
| 4,710,438 A | | 12/1987 | Leben et al. | |
| 5,006,972 A | | 4/1991 | Hammond et al. | |
| 5,796,636 A | * | 8/1998 | Andrews | H02H 3/335 |
| | | | | 361/93.2 |
| 6,573,008 B1 | * | 6/2003 | Hasvold | H01M 12/04 |
| | | | | 429/231.8 |
| 2005/0229964 A1 | * | 10/2005 | Liao | H02J 7/35 |
| | | | | 136/252 |
| 2011/0227541 A1 | * | 9/2011 | Duggal | H01M 10/39 |
| | | | | 320/137 |
| 2012/0305651 A1 | * | 12/2012 | Anderson | B82Y 30/00 |
| | | | | 235/492 |
| 2013/0316196 A1 | * | 11/2013 | McCluskey | H01M 8/065 |
| | | | | 429/9 |
| 2015/0248986 A1 | * | 9/2015 | Flores Silguero | H01H 71/164 |
| | | | | 337/36 |
| 2017/0201077 A1 | * | 7/2017 | Hafner | H05K 7/14 |

* cited by examiner

IONIC ELECTRIC POWER STATION

OBJECT OF THE INVENTION

The Ionic electric power station is a modular installation that can be connected to any amount of electrical energy. At it, ionic reactions are provoked to generate electrical energy with basic elements such as water ($H_2O$)+dissolved sodium chloride (NaCl), as found in the seas and oceans in their natural state.

In addition to sodium chloride, which is the main base, other electrolytes can be added to this liquid solution that acts as a clean energy generator fuel in order to improve performance.

PRIOR STATE OF THE ART

In terms of electricity generation and accumulation, we are familiar with energies generated by:
  Batteries and accumulators operate with redox-type processes, oxidation reduction.
  A battery is essentially a can full of chemicals that produce electrons. Chemical reactions are capable of producing electrons and this phenomenon is called an electrochemical reaction, which ends once the possible chemical reactions have been exhausted, and so the useful life of the element ends; contaminating the environment if it is abandoned or if recycling is necessary to avoid this effect.
  If a battery is examined, it has two terminals. One terminal is marked positive (+), while the other is marked negative (−). For an AA, or C (most common batteries), the ends are the terminals. For a car battery, there are two large tubes that act as terminals. The most common are:
  Zinc batteries, also known as standard carbon batteries. Zinc-carbon chemistry is used in any AA, or related battery. The electrodes are made of zinc and carbon, with an acidic bond between them as an electrolyte.
  Alkaline batteries. The electrodes are zinc and manganese oxide with an alkaline electrolyte.
  Nickel-cadmium battery. These use nickel hydroxide and cadmium electrodes with potassium hydroxide as the electrolyte. They are rechargeable.
  Nickel-metal hydride. Rechargeable. They quickly replaced nickel-cadmium because they do not suffer from the problems of the former.
  Lithium-ion. Rechargeable. Very good performance percentage used in the latest laptops and mobile phones.
  Silver-zinc. Used in aeronautical applications because the performance percentage is good.
  Salt water batteries. Used in life jackets, radio beacons and other applications where a small amount of energy is required for a limited time and where electrolytes cannot be used for expiration reasons. They are small elements composed of two metals with a different galvanic couple connected to a lamp or a radio beacon of low electrical consumption, which are not hermetically located inside an airtight cell so that when they come into contact with the sea, an electrochemical reaction takes place that remains stable for a short time while the element is immersed in living water, in other words, in seawater where the sea current renews the water and the level of dissolved oxygen between the two electrodes.
  Electric thermal generators for fossil fuel combustion
  Power Stations powered by radioactive elements.
  Renewable energies:
  Renewable energies that use an energy source or fuel that is considered inexhaustible, or that can be regenerated at the same rate as it is consumed.
  Classification of renewable energies depends on the natural resources used.
  Solar Energy.
  There are two ways of using solar energy: solar thermal power and photovoltaic solar energy.
  The use of solar thermal energy consists of using the thermal energy obtained through the radiation of the sun to heat a fluid that, depending on its temperature, is used to produce hot water and even steam.
  The use of photovoltaic solar energy is carried out through the direct transformation of solar energy into electrical energy by means of the so-called photovoltaic effect. This transformation is carried out by "solar cells" which are made of semiconductor materials (e.g. silicon) that generate electricity when solar radiation strikes them.
  Wind Energy.
  Wind energy systems use the kinetic energy contained in the wind to produce electricity by means of so-called wind turbines. There are two types of wind turbines:
    Isolated, to generate electricity in remote places for self-consumption. It is very common for these installations to be combined with photovoltaic panels.
    Wind farms, formed by a set of wind turbines, to sell the electricity generated to the grid.
  Current technological developments, as well as a greater knowledge of wind conditions in the different areas, are enabling the implementation of wind farms connected to the electricity grid in many regions around the world.
  Mini-Hydraulic Energy.
  Harnessing the potential energy of water from a drop to produce electricity is what is known as Hydraulic Energy. The water moves a turbine whose rotating movement is transferred by an axis to an electricity generator. This type of energy is considered renewable when the power is less than 10 MW (Minihydraulic Energy).
  There are basically two types of hydroelectric power stations:
    Flowing water power stations: Those that capture part of the flow circulating through a river and take it to the power station to be turbined and generate electricity. This flow is then returned to the riverbed.
    Power stations at the foot of the dam: Those located downstream of reservoirs for hydroelectric or other purposes such as water supply to towns or irrigation. They have the advantage of storing energy (water) and being able to use it when it is most needed.
  Energy from Biomass.
  Biomass is an energy source based on the use of organic matter of plant or animal origin, including the products and by-products resulting from its transformation. The term biomass is used for the collection of energy materials of many different kinds: forest residues, woody and herbaceous agricultural waste, residues from various industrial processes, energy crops, organic materials contained in urban solid waste, biogas from livestock waste or biodegradable waste from industrial installations, from the treatment of urban waste water or from landfill sites, etc. Biofuels, which are mainly applied in transport, can also be included under the term biomass.
  Biomass applications can be grouped into two groups:
    Domestic and industrial applications that operate via direct combustion of biomass.

Applications linked to the emergence of new resources and new processing techniques, such as gasification and pyrolysis of biomass.

Tidal and Wave Energy.

The seas and oceans are huge solar collectors from which energy can be extracted from various sources (waves, tides and thermal gradients).

The energy released by the seawater in its upward and downward tidal movements (ebb and flow) is used in tidal power stations by passing the water through hydraulic turbines. Wave energy is produced by the winds and is very irregular. This has led to a multitude of types of machines for their use.

Finally, ocean thermal energy conversion is a method of converting the temperature difference between surface water and water 100 m deep into useful energy. A difference of 20° C. is sufficient for use. The advantages of this energy source are associated with the fact that it is a permanent and environmentally benign thermal leap.

Geothermal Energy.

Geothermal energy is the manifestation of thermal energy accumulated in rocks or waters that are found at high temperatures inside the earth.

For use in areas with special thermal conditions, e.g. volcanic areas, a fluid is circulated in these areas which transports the heat energy to the surface in the form of heat stored in the hot areas.

The energy generated depending on its temperature (high, medium or low) is used either to produce electricity to heat water or for heating.

Geothermal energy has the main advantage that its environmental impact is minimal, and it has yields that allow it to compete with oil. But its main disadvantages include it requiring large investments and that geothermal fields are relatively scarce and are often located in unfavourable areas.

EXPLICATION OF THE INVENTION

The operation of the Ionic electric power station is based on the use of two elements located inside a cell for the generation of electricity, comprising at least the metal anode, both of which are immersed in the same electrolyte without membranes separating these elements, one of which acts as the active or anodic end and the other as the noble or cathodic end.

The simultaneous presence of water (electrolyte) and oxygen (oxidant) makes electrochemical corrosion virtually inevitable.

The dissolution of the salt (NaCl) in water produces particles called positively charged (NA+) and negatively charged (Cl−) Ions that, in contact with the metals, are transformed into electrons, producing the electric current.

These particles are distributed among the water molecules, which we place in a system of cells similar to the galvanic ones, which produce electrical energy via a reduction effect in the cathode and oxidation in the anode. They differ from the conventional galvanic cells in that both (anode and cathode) share the same submerged solution in the percentages of water (963 per thousand), sodium chloride (NaCl) (35 per thousand), and oxygen can be added to the electrolyte by means of an air diffuser to enrich it with oxygen. This being sufficient to obtain a profitable current, and the intensity and voltage can be increased by adding to the electrolyte oxidative molecules present in other chemical compounds in very low proportions, around 2 per thousand.

The problem solved in this invention is the correction of Tafel's behaviour, because salt water is a potent electrolyte.

Therefore, when two different metals, which have different reactivities, are immersed in the same conductive solution which we call electrolyte and are electrically connected to each other, we will have a flow of electrons from the most active or anodic metal to the most noble or cathodic metal, leaving the anodic material with an electron deficiency. The anode is comprised of an active metal and the cathode of a noble metal. The negative electrode (anode) is where corrosion occurs. This corrosion tends to protect the oxidative process of the anode and as a result the electrical production fall.

In order to obtain pure metals, we must resort to separating them from their minerals, which is a great energy source, and it is necessary for the metal to absorb and store a certain amount of energy, so that this energy will allow the subsequent return to its original state through an oxidation process.

As indicated in the description of the drawing inside the electricity generating cell, there is a sacrificial anode of a metal whose energy will be recovered through the corrosion that will occur inside the cell in a controlled way, slowly producing the dissolution of the anode.

There are behaviours that considerably reduce this corrosion and consequently the electrical production, making it unviable to exploit this energy without correcting this behaviour.

By means of the technique developed and applied in this invention, these behaviours have been effectively corrected by solving the problem, the solution to which allows for optimum electrical generation.

In order for this corrosion to occur in a constant way and without falls in the production of electric current, this invention strengthens the kinetics inside the generating cell in a closed circuit, creating the optimum conditions for the electrochemical process to gather and renew all the necessary elements of the electrolyte inside the cell in order to maintain the electrochemical process constant, in particular the contact and renewal of the dissolved chemical elements with the metals, and thus avoid the voltage drop produced by the deviations to the behaviour of TAFEL, whose deviations occur when the speed of the reaction is controlled by a slower stage in the process sequence due to the polarisation by concentration on the cathode and anode surfaces that produces the decrease of the electron flow production and the consequential fall of the intensity of the electric current and its voltage. This effect arises from a deficiency in the supply of reagents that take part in the electrochemical reaction that occurs inside a generating cell, so that the speed of the reaction would often be limited when it increases, due to the slow speed with which the reagents reach the surface of the electrode or to the speed with which the products of the reaction are diffused into the solution, due to the scarcity of reagents or excess of products.

The implications of concentration polarisation for a corroding system are very important. The polarisation concentration affects the cathodic reaction due to the supply of H+, dissolved oxygen and other electrolyte elements such as sodium (Na+) and chlorine (Cl−) ions.

The rate of corrosion and electrical production depends entirely on the transport of cathode reagents to the metal surfaces. In the latter case, the poor supply of the cathodic reagent, either due to a low concentration of H+ or dissolved atmospheric oxygen in the aggressive medium (salt water), or the hydroxides accumulated in the cell, help to reduce the speed of a corrosion process by controlling the situation the cathodic reaction.

To avoid these undesirable effects, the cells belong to a closed circuit of the electrolyte so that the Ionic Electric Power Station automatically periodically recirculates the liquid content of the cells to renew the content of their components and thus keeps the required voltage stable, increase or decrease it by correcting the deviations produced by Tafel's behaviour.

The cells are connected in series or in parallel until the required voltage and current are reached.

The cells can be part of an open circuit in situations where there is direct access to seawater, in coastal installations or on boats.

The main advantages of the Ionic Electric Power Station in relation to the state of the art described are:

It is a modular device, connectable to each end user in number of units needed to obtain the required power, from a house, an industry, a hotel, a transport service, etc.

It uses renewable energies for electricity production.

It is an autonomous and economic source of energy that generates independence and energy freedom for the user, limiting maintenance to the recirculation of water and salt, as well as the replacement of the electric accumulators every five years, and the anodes of the cells in the long term at a low cost.

PREFERRED METHOD OF EMBODIMENT

Figure 1:
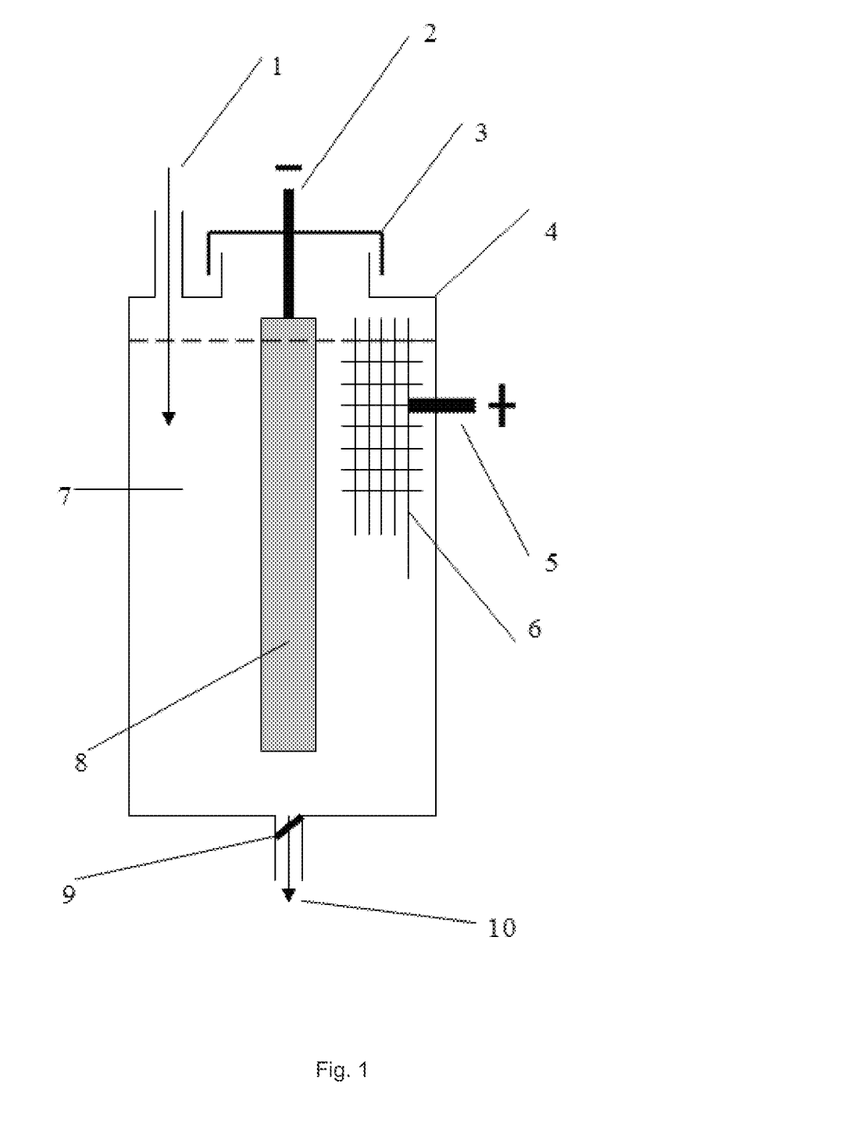
FIG. 1 represents the elevation of the generating cell.

According to FIG. 1 which represents the elevation of the generating cell, this invention is comprised of a plurality of cells connected in series and parallel to each other. It consists of an electrolyte inlet and gas outlet duct (1), a negative sign anode connection terminal (2), a cover for opening the cell (3), a container with an insulated cell (4), a cathode connection terminal with positive sign (5), a cathode (6), an internal space occupied by the electrolyte (7), and anode (8), a valve to evacuate the electrolyte from the cell and keep the electrolyte (9), and an electrolyte outlet line (10).

Figure 2:
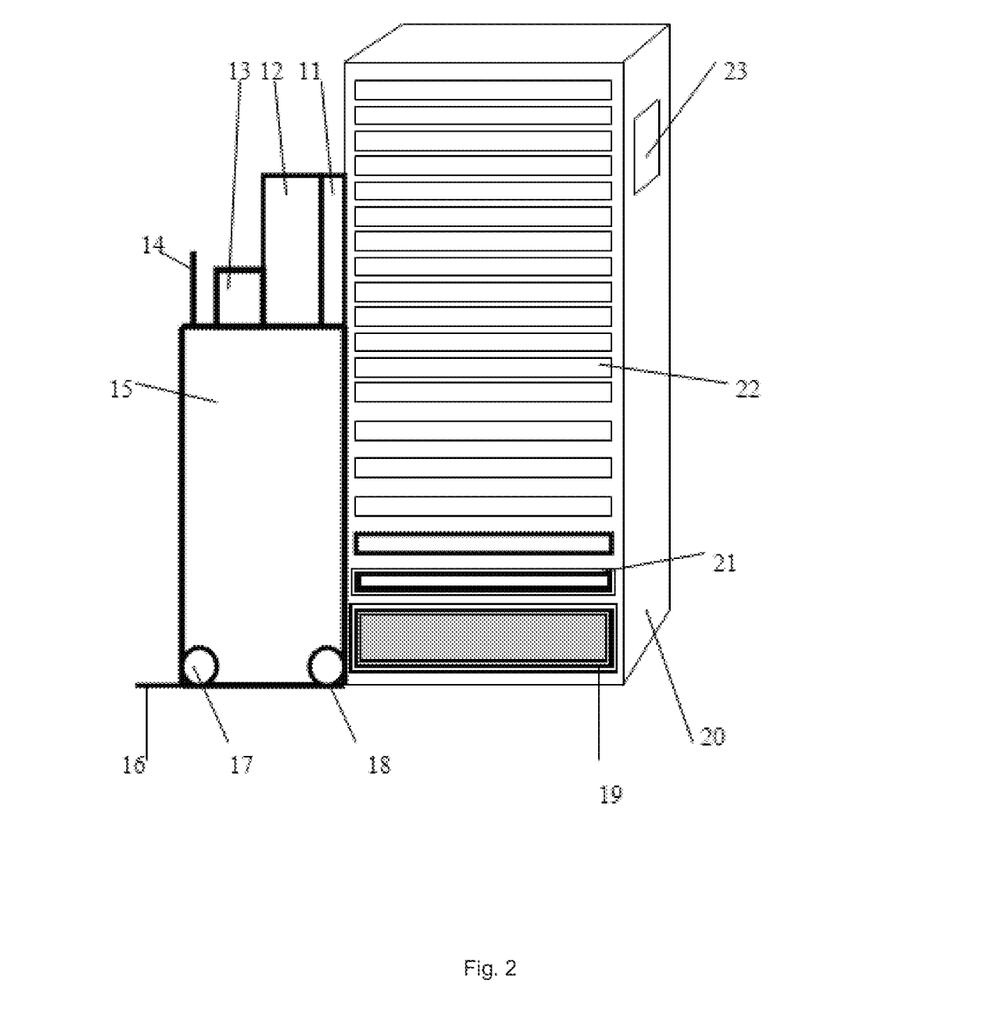
FIG. 2 represents the elevation of the Ionic Electric Power Station.

According to FIG. 2, which shows the elevation of the IONIC ELECTRIC POWER STATION, it is made up of a deposit of other oxidation-enhancing electrolytes (11), a deposit of sodium chloride (NaCl) (12), a dosing device for the electrolytes (13), a water connection (14), am electrolyte tank (15), a water outlet pipe for cleaning the filter and emptying the tank (16), a filter for the electrolyte (17), a pump that drives the electrolyte from the tank to the generating cells (18), batteries accumulating the electrical surplus produced (19), a container cabinet for the cubicles and other elements (20), an electronic module controller for charging the batteries and transferring the current to the mains and direct current to alternating current converter (21), removable trays in the cabinet containing the cubicles connected in series and interconnected in parallel (22), a general differential electrical protection panel and thermal magnet and output connection for the electrical supply and output connection for the electrical supply (23).

Figure 3:
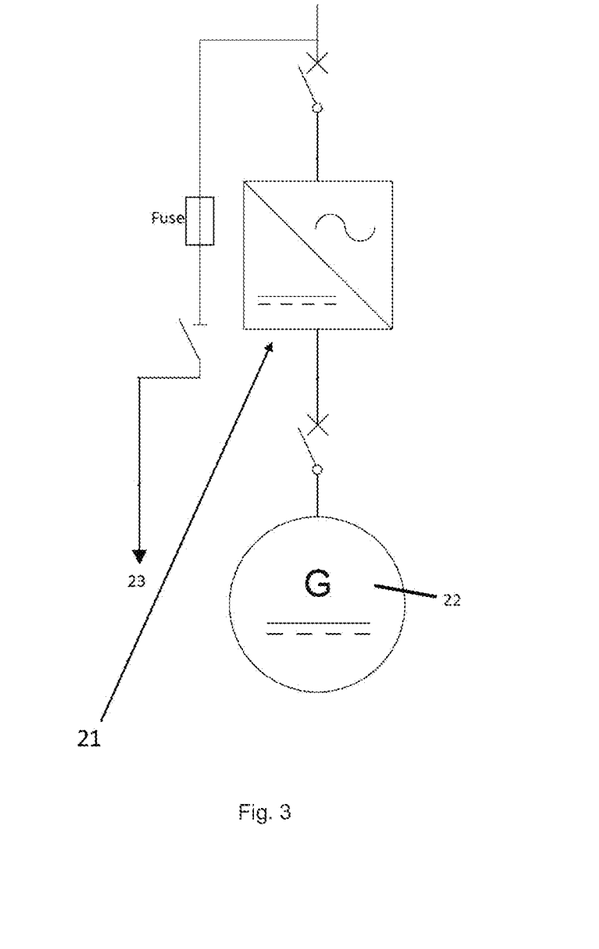
FIG. 3 represents a schematic unifilar diagram of the assembly including a generator cell, an AC/DC convertor, and the current output to protections and consumers.
Figure 4:
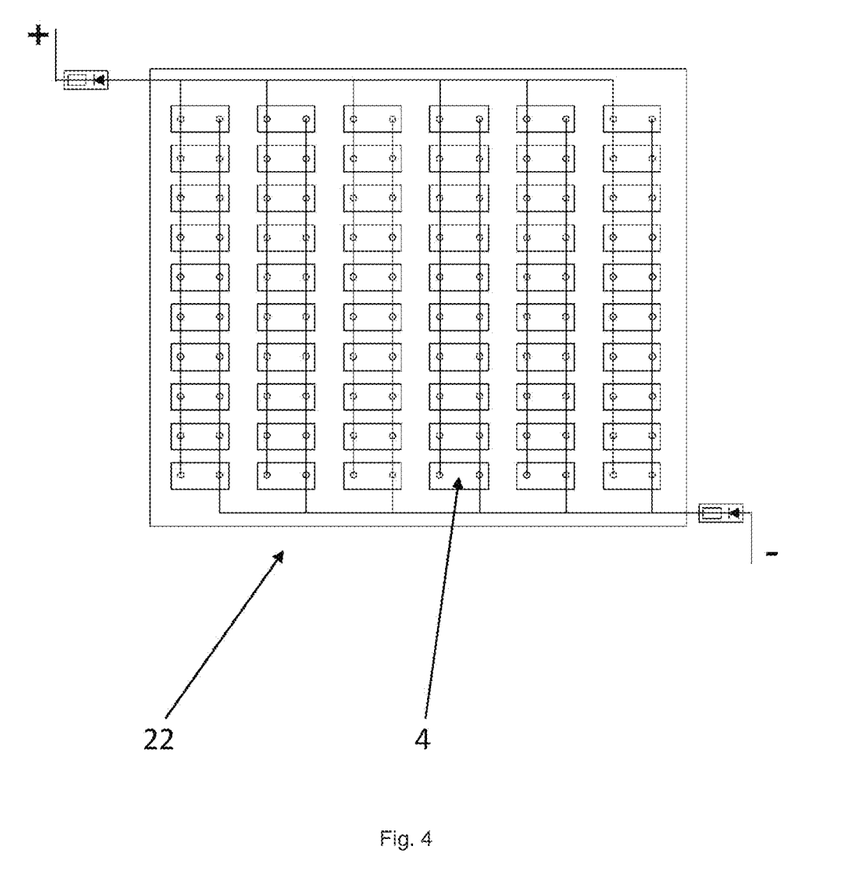
FIG. 4 represents a schematic unifilar parallel connection of the removable trays in the cabinet containing the cubicles connected in series and interconnected in parallel and its cells.
Figure 5:
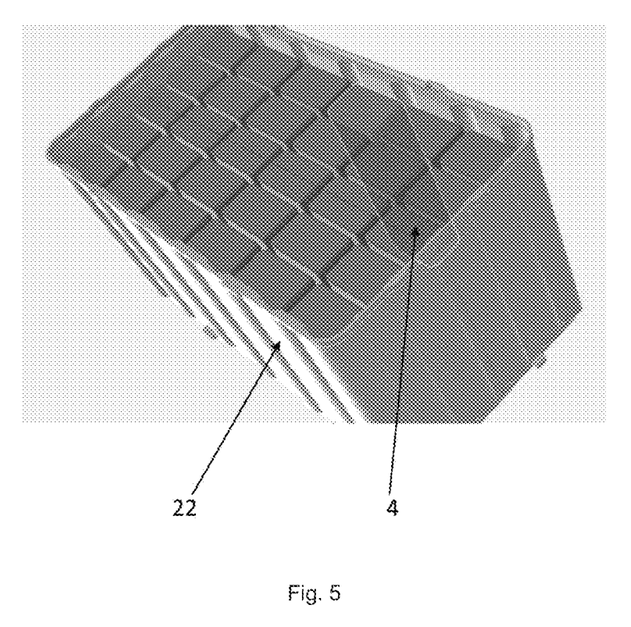
FIG. 5 represents a three-dimensional illustration of the internal configuration of the cells that make up the removable trays which can be interconnected in parallel and in serial too.
Figure 6:
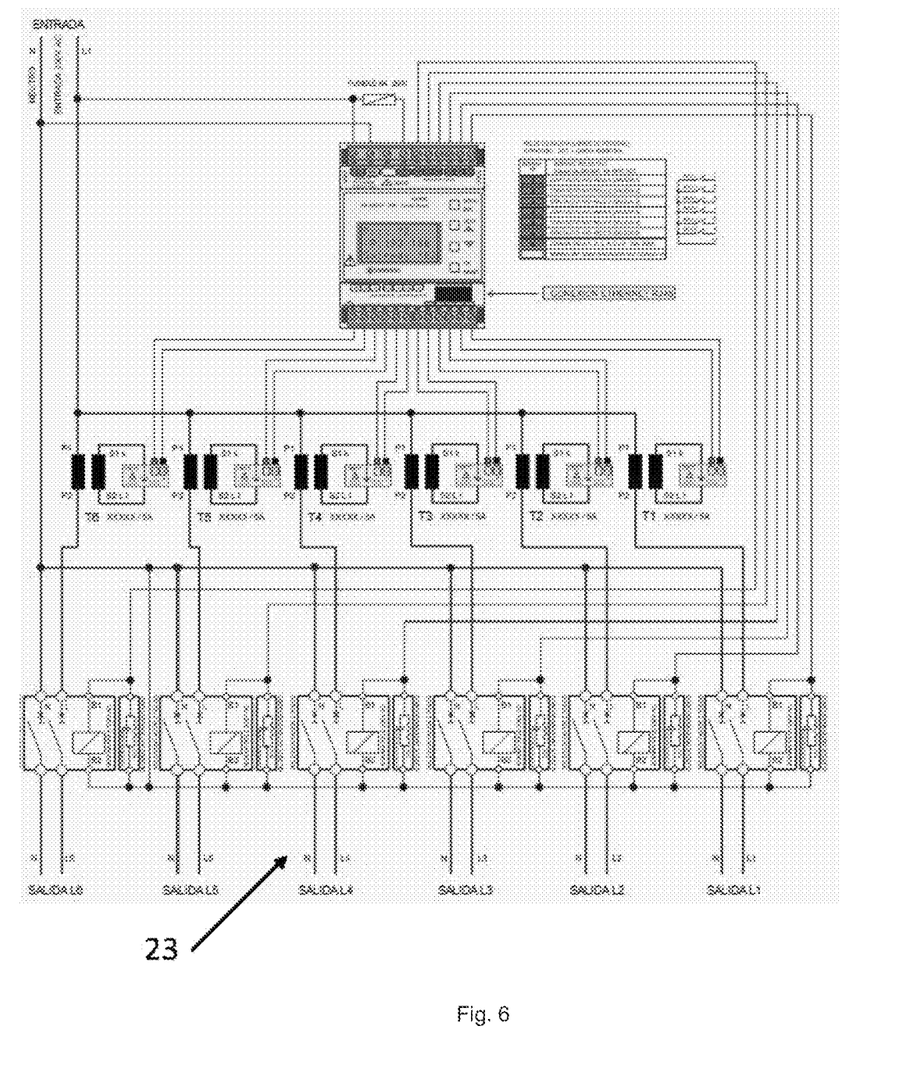
FIG. 6 represents a schematic illustration of a general differential electrical protection panel and thermal magnet and output connection for the electrical supply.

FIG. 3 represents a unifilar diagram, the details of the electronic module controller for charging the batteries and transferring the current to the mains and direct current to alternating current converter (21), the internal configuration of the cells that make up possible removable trays that can be connected in series and in parallel (22), a general differential electrical protection panel and thermal magnet and output connection for the electrical supply and output connection for the electrical supply (23). FIG. 4 represents a unifilar diagram of the removable trays in the cabinet containing the cells connected in series and interconnected in parallel (22) and the insulated cells (4) inside. the one view external aspect of the removable trays in the cabinet containing the cubicles connected in series and interconnected in parallel and the insulated cells. FIG. 5 represents a three-dimensional illustration of the internal configuration of the cells that make up the removable trays which can be interconnected in parallel and in serial. FIG. 6 represents the general differential electrical protection panel and thermal magnet and output connection for the electrical supply (23).

The invention claimed is:

1. An ionic electric power station comprising:
   cells that generate electricity using salt water as an electrolyte, the cells connected in series and interconnected in parallel,
   a tank connected to an outside of the cells for the electrolyte,
   an electrolyte measuring and dosing device adjacent to and connected to the tank,
   a water inlet into the electrolyte tank,
   a discharge pipe for a water outlet, the discharge pipe connected to the electrolyte tank,
   a pump within the tank to drive the electrolyte from the tank to the cells,
   characterized in that the ionic electric power station further comprises:
   a deposit of sodium chloride (NaCl) sea salt adjacent to the tank,
   a filter for the electrolyte at the discharge pipe,
   a container cabinet for the cells and other elements, wherein the container cabinet contains removable trays containing the cells,
   accumulator batteries within the container cabinet for the surplus electricity produced,
   an electronic module within the container cabinet for battery charge and current transfer to a mains,
   a direct current to alternating current converter module within the container cabinet,
   a general differential electrical protection panel and a thermal magnet on a surface of the container cabinet,
   an output connection on the surface of the container cabinet for the power supply;
   and wherein the electrolyte comprises percentages of Sulfuric Acid ($H_2SO_4$).

2. The ionic electric power station according to claim 1, wherein the cells each consist of an input and output of the electrolyte and connection terminals to an anode and a cathode, the anode being interchangeable via opening a cover.

3. The ionic electric power station, according to claim 2 characterised by use in the cells as a cathode in the form of a tube, smooth plate, rods or stainless-steel mesh.

4. The ionic electric power plant, according to claim 2 characterised by use in the cells as a cathode in the form of a tube, smooth plate, rods or gold or nickel mesh.

5. The ionic electric power station, according to claim 2 characterised by using in the cells as a cathode in the form of a tube, smooth plate, rods or platinum or copper mesh.

6. The ionic electric power station, according to claim 2 characterised by using in the cells as a cathode in the form of a tube, smooth plate, rods or graphite or brass mesh.

7. The ionic electric power station, according to claim 2 characterised by using in the cells as a tube anode in the form of a tube, smooth plate, rods or Zinc mesh.

8. The ionic electric power station, according to claim 2 characterised by use in the cells as an anode in the form of a tube, smooth plate, rods or Magnesium mesh.

9. The ionic electric power station, according to claim 1 characterised by use in the cells as an anode in the form of a tube, smooth plate, rods or beryllium mesh.

10. The ionic electric power station, according to claim 2 characterised by use in the cells as an anode in the form of a tube, smooth plate, rods or aluminium alloy mesh.

11. The ionic electric power station, according to claim 2 characterised by use in the cells as an anode in the form of a tube, smooth plate, rods or Cadmium mesh.

12. The ionic electric power station, according to claim 1 characterised in that it comprises a general electrical protection box, which is automatically or remotely resettable, the differential protection module and the thermal magnet and oscilloscope that include relay outputs na/nc, programmable in all its functions, with a consumption meter and all these elements connected to the internet by cable or Wi-Fi for remote monitoring.

* * * * *